United States Patent [19]

Carbullido

[11] Patent Number: 4,975,945

[45] Date of Patent: Dec. 4, 1990

[54] UNIVERSAL TELEPHONE CALL RELAY SYSTEM

[75] Inventor: Kenneth D. Carbullido, Omaha, Nebr.

[73] Assignee: First Data Resources Inc., Omaha, Nebr.

[21] Appl. No.: 396,157

[22] Filed: Aug. 21, 1989

[51] Int. Cl.$^5$ .............................................. H04M 3/54
[52] U.S. Cl. ...................................... 379/212; 379/88; 379/214; 379/265; 379/67
[58] Field of Search ............... 379/210, 211, 214, 212, 379/201, 265, 266, 309, 96, 67, 88, 89

[56]  References Cited

U.S. PATENT DOCUMENTS

| | | | |
|---|---|---|---|
| 4,145,578 | 3/1979 | Orriss | 379/266 X |
| 4,376,875 | 3/1983 | Beirne | 379/88 |
| 4,805,209 | 2/1989 | Baker, Jr. et al. | 379/212 X |

Primary Examiner—James L. Dwyer

Attorney, Agent, or Firm—Nilsson, Robbins, Dalgarn, Berliner, Carson & Wurst

[57]  ABSTRACT

In cooperation with a public telephone network, an automated call processing system incorporates an audio response unit and a computer for effectively relaying calls to a manually attended terminal. Individual calls are assigned unique call reference numbers which are stored along with pertinent information of the call. If a call relay is commanded, the computer actuates a PBX to establish a secondary connection through the telephone network to an attended CRT terminal. Using the secondary connection, the operator at the terminal is given the reference number which addresses the call data fetching it to the terminal for use by the operator. As a final operation, the secondary communication path is bridged placing the operator at the attended terminal in communication with a caller through the original connection established through the audio response unit.

6 Claims, 2 Drawing Sheets

UNIVERSAL TELEPHONE CALL RELAY SYSTEM

BACKGROUND AND SUMMARY OF THE INVENTION

With the growth of computer techniques, related data handling telephonic communication systems also have expanded In that regard, telephonic apparatus have been developed for effectively interfacing automated systems with callers. Specifically, audio response units have been developed to automate telephonic communications and data processing by effectively interfacing with remote callers. For example, an audio response unit may instruct a caller to identify desired information in a memory bank by actuating the telephone keypad. Consider a specific example. A caller desiring the status of his financial account may be vocally instructed to actuate the telephone instrument push buttons providing digital data that is utilized to locate the desired information from a memory bank. The audio response unit may then vocally report the desired information.

Although audio response units have come into widespread use, situations are not uncommon when it is desired to relay a caller to a live operator Typically, live operators are positioned at cathode ray tube (CRT) display terminals and have information involving the subject of communication. Although various techniques have been proposed for transferring a caller from an audio response unit to a live operator, traditional techniques have involved some distinct disadvantages. One limitation involves compatibility or the lack of flexibility. That is, only switching systems which are capable and compatible can execute the relay process. In that regard relays outside the realm of a tightly controlled closed system likely are not coordinated and may involve difficulty. Also, the interaction required to coordinate a call relay is often complex and prone to breakdown. Maintenance and management of the somewhat complete typical traditional relay systems are generally expensive. Accordingly, a need exists for a simple, universal, reliable and economical system for flexible use to relay calls from an audio response unit to an attended terminal.

In general, the present invention comprises a call processing system for use with a telephonic communication facility, as to process information and with the specific capability of relaying callers (incoming or outgoing) to an attended terminal. In the first instance, an audio response unit interfaces callers who are assigned call reference numbers. Data obtained from callers is stored in memory addressable by the call reference numbers.

On the occurrence of predetermined conditions indicating the need for a relay, the caller is momentarily set to wait and the audio response unit dials an attended terminal for secondary communication through the telephone facility The secondary communication path is employed to communicate the call reference number to an operator at an attended terminal. Thus, the operator can actuate the terminal to receive a display of the caller information so as to pursue the interface. The operation is completed with the bridging of communication between the caller and the attended terminal and the secondary communication is merged. Thus, a relatively economical system accommodates simple, flexible and universal call relays.

BRIEF DESCRIPTION OF THE DRAWINGS

In the drawings, which constitute a part of this specification, an exemplary embodiment exhibiting various objectives and features hereof is set forth. Specifically.

DESCRIPTION OF THE ILLUSTRATIVE EMBODIMENT

As required, a detailed illustrative embodiment of the present invention is disclosed herein. However, physical communication systems, data formats and operating structures in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
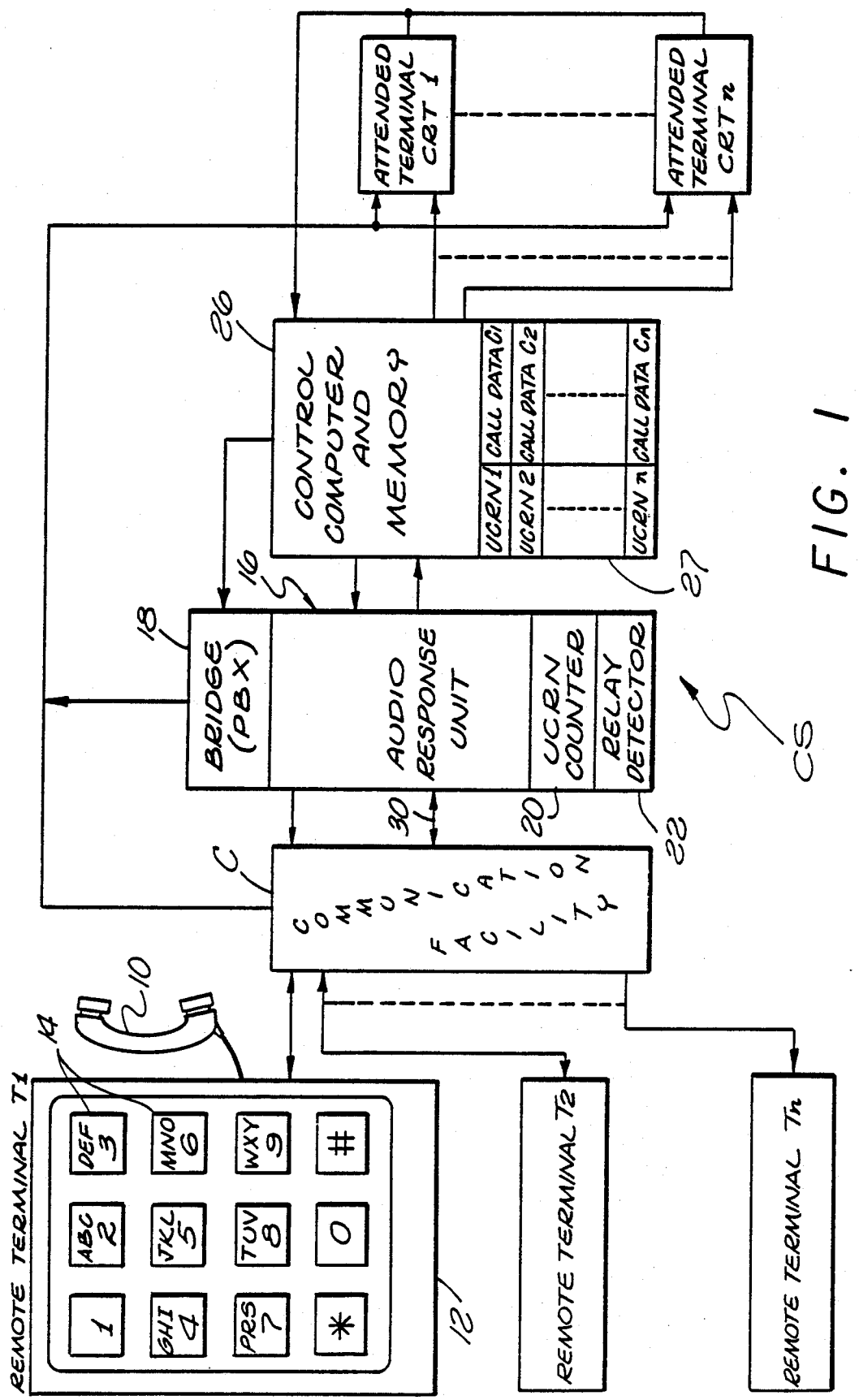
FIG. 1 is a block diagram of a system constructed in accordance with the present invention.

Referring initially to FIG. 1, a communication facility C (center, left) is indicated representing a comprehensive telephone system including a multitude of remote terminals T1-Tn (left). From the remote terminals T1-Tn, callers interface a central station CS (right) as to obtain status information or perform any of a number of information processing functions. In accordance herewith, the processing of such calls may be automated or, under predetermined conditions, the apparatus of the central station CS expediently relays calls to an attended terminal as disclosed in detail below.

Considering the system of FIG. 1 in greater detail, an exemplary telephone terminal T1 includes a handpiece 10 (microphone and earphone) and a panel 12 provided with a rectangular array of individual push buttons 14 in a conventional configuration. Of course, the handpiece 10 accommodates analog voice signals while the panel 12 is a digital apparatus.

Operating in an automated format, a caller is cued through the handpiece 10 (earphone) to provide data in accordance with a specific format. Typically, the caller provides data in a digital form by actuating the push buttons 14. Of course, the telephonic contact for an interface between one of the remote terminals T1-Tn and the central station CS through the communication facility C is established by actuating the push buttons 14 at the terminal or initiated at the central station CS.

To consider incoming calls, as a result of telephonic dialing, the communication facility C couples the terminals T1-Tn to an audio response unit 16. Various forms of audio response units are well known in the prior art that are capable of providing voice or audio signals to instruct a caller in the provision of digital signals for processing. Note that the audio response unit 16 can accommodate many calls simultaneously. Also, audio response units can be ganged together for greater capacity.

The audio response unit 16 is illustrated integral with a bridge or PBX unit 18, a UCRN counter 20 and a relay detector 22. Structurally, the PBX portion of the audio response unit 16 incorporates a bridge 18 as treated in detail below. In various embodiments, these units may be variously constructed and associated in the audio response unit 16; however, for purposes of explanation, separate function blocks are represented.

Operating in combination with the audio response unit 16, the internal PBX unit dials remote terminals T1-Tn through the communication facility C for connection with the audio response unit 16. The capability is involved in the disclosed embodiment and also may be used for outgoing call programs as well known in the art.

The UCRN counter 20 may take the form of a relatively simple incremental device for developing a unique call reference number (UCRN) for each incoming call processed by the audio response unit 16. The counter is incremental with each call to provide signals representative of the identification number or UCRN that is instrumental in relaying calls in accordance with the present invention. Alternatively, a look-up table could be consulted with port numbers to provide the unique reference number.

The relay detector 22 associated with the audio response unit 16 may comprise a logic circuit for detecting any of certain predetermined conditions indicating the need to relay a call. In that regard, the relay is from the audio response unit 16 to an operator at an attended terminal as described in detail below. The conditions might include activation of select push buttons 14 by the caller, the receipt of unresponsive data patterns by the audio response unit and so on.

The audio response unit 16 is connected to a control computer and memory unit 26. As illustrated, the unit 26 includes a series 27 of data cells C1-Cn, each of which is addressed by a number (UCRN), respectively the numbers UCRN1 through UCRNn.

The control computer and memory unit 26 controls the audio response unit 16 along with a switching unit or bridge 18 and a series of attended CRT terminals CRTI through CRTn. The terminals CRTI through CRTn are operator telephone terminals with display capability (cathode ray tube) and each is connected through a cable 30 to the communication facility C. The terminals CRTI through CRTn are also coupled for operation through the unit 26 and the audio response unit 16.

Figure 2:
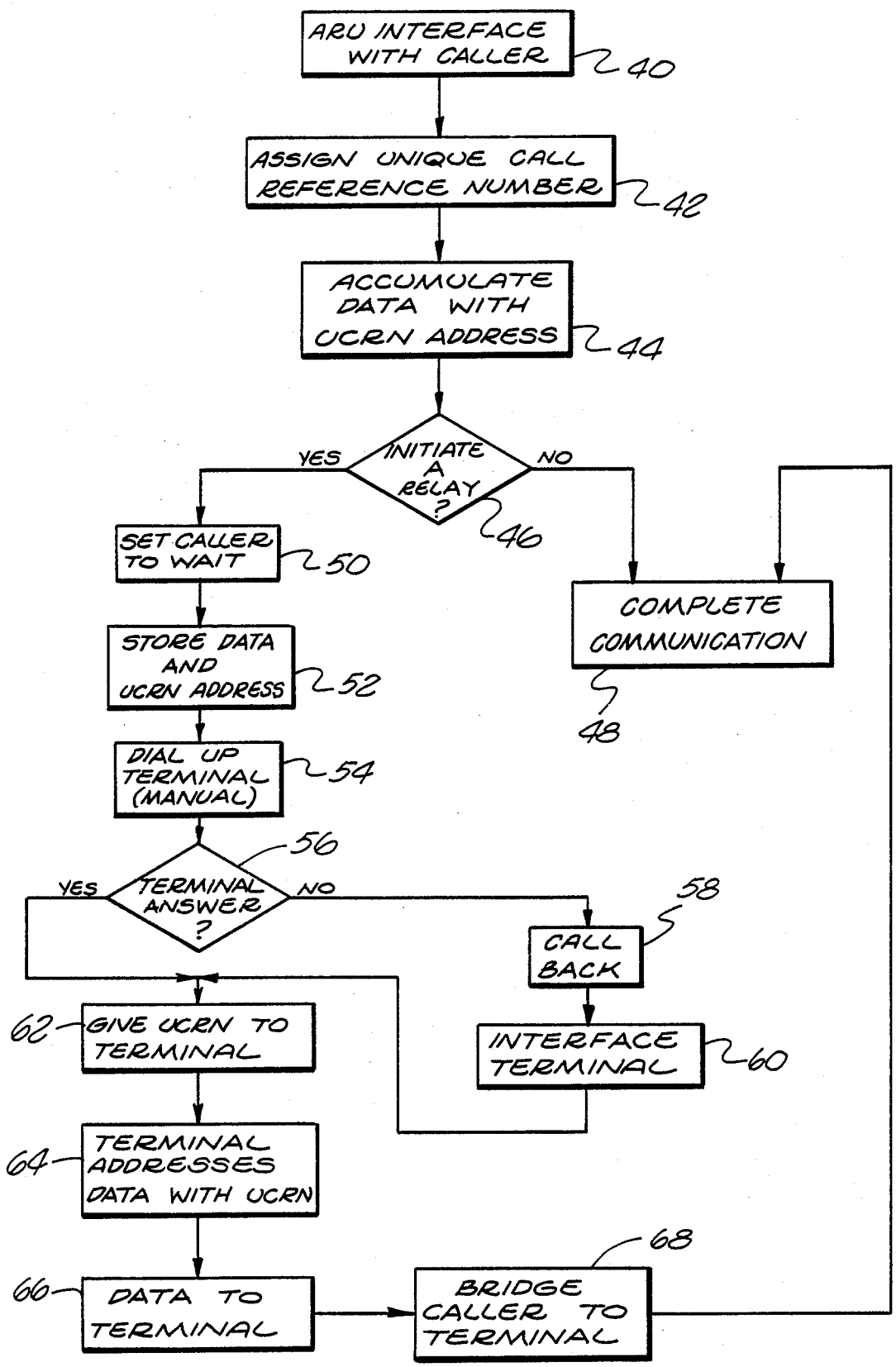
FIG. 2 is a flow diagram illustrating the operating process of the structure represented in FIG. 1.

In view of the above preliminary structural description, an understanding of the system of FIG. 1 and its operation may now be best accomplished by assuming certain conditions and proceeding with the explanation of functional operations and process as illustrated in FIG. 2. Accordingly, assume that the audio response unit 16 (FIG. 1) is programmed to interface individual callers in any of several formats. For example, the audio response unit 16 may be programmed to function cooperatively with the control computer and memory unit 26 so as to provide various information formats or receive specific instructions, e.g. status of account, mail order and so on. In accordance with well known techniques, the audio response unit 16 determines the desired format for each caller based on the number dialed, the particular physical port or telephone hunt group dialed, or as a result of a digital selection by the caller.

Next, assume the existence of a caller at the remote terminal T1 who has a desire to interface with the central station CS as to exchange or process information. In accordance with conventional operation, the caller actuates the push buttons 14 commanding the communication facility C to dial up the audio response unit 16. As suggested above, after some preliminary interaction, the caller is interfaced with the desired format. In that regard, it should be recognized that the assumed interface may be completed successfully without relay to an operator However, the situation in which the caller must be relayed to a human operator is pertinent to the present invention.

When the caller accomplishes an interface with the audio response unit 16, the UCRN counter 20 provides signals representative of a specific identification number (unique call reference number) assigned to the instant call Initially, the identification signals are stored in the unit 16.

Typically, the initial phase of communication between the caller and the audio response unit 16 involves preliminary information, e.g. the caller's telephone number, credit card number, identification data and so on. Such information may be provided in a digital format from the terminal T1 and registered by the audio response unit 16 along with the reference number from the UCRN counter 20.

Tracing the above preliminary operations with respect to FIG. 2, a block 40 indicates the audio response unit (ARU) interface with the caller. The assignment of the unique call reference number to the call is indicated by the block 42 and the accumulation and storage of preliminary data along with the number is indicated by the block 44.

The determination that a call is to be relayed to an operator may be variously programmed into the system of FIG. 1 on the basis of predetermined criteria. The step is illustrated in FIG. 2 by a query block 46. To prompt a relay, callers might be instructed that depressing the asterisk button "*" on the telephone panel 12 will relay their call to an operator. Several other alternative conditions might similarly actuate the relay detector 22 to initiate a relay. Note also that the query block 46 (FIG. 2) may be variously positioned in the time sequence of a call.

As illustrated in FIG. 2, if the need never arises to "initiate a relay", the communication may be completed as represented by the block 48. In the instance of the exemplary call, assume the need to initiate a relay occurs and as a result, the process proceeds to the step of block 50, i.e. "set the caller to wait".

The need to initiate a relay is detected by the relay detector 22 (FIG. 1) which is manifest by a signal in the audio response unit 16 and the control computer and memory unit 26. As initial operation, the caller is placed on hold. Depending on the program, the caller may be variously advised or occupied For example, the audio response unit 16 may notify the caller of the pending transfer, introduce music to the caller's line or repeatedly provide updates on the status of the relay operation.

With the caller on "hold", the audio response unit 16 stores the call data addressed by the identification number in the control computer and memory unit 26. Specifically, the identification or reference number (UCRN) might be "501", and accordingly would be set as an address for the identified caller's data as illustrated by the series of cells 27 of the unit 26. That is, the caller's data identified by the identification or UCRN "501" is stored in a cell 27 addressed by the number "501". The storage operation is illustrated by the block 52 in FIG. 2.

With the information stored, the audio response unit 16 next actuates the internal PBX to dial up one of the attended terminals CRTI through CRTn Note that the terminals CRTI through CRTn may be variously multiplexed on the cable 30 with the consequence that a manned available terminal usually responds to the call signal. The call involves a secondary communication, established from the unit 16 to a terminal CRT through the communication facility C.

In FIG. 2, the block 54 indicates the operation of dialing one of the terminals CRT1 through CRTn. As indicated by the query block 56, the possibility exists that no manned terminal is available. In such an event, stored data may be flagged and the caller given a message for a return call. The operations are represented in FIG. 2 by the blocks 58 and 60.

Assume one of the terminals CRT1 through CRTn responds to the secondary or independent call. As a result, the responding terminal, say terminal CRT5 must obtain the data relevant to the call. Specifically, as illustrated by block 62 (FIG. 2), the audio response unit 16 (FIG. 1) repeatedly announces the identification number or UCRN "501" to the operator at the terminal CRT5. Note that during this interval the caller remains on hold; however, the wait should not exceed a minute.

Upon hearing the identification number, the operator at the terminal CRT5 punches the digits "501" into the terminal CRT5 commanding the control computer and memory unit 26 to fetch the call data C501 as addressed by the number "501". The operation is illustrated by a block 64 in FIGURE 2. Consequently, the data pertinent to the instant call is supplied directly to the terminal CRT5 through the computer and memory unit 26.

At the attended terminal CRT5, the data C501 is displayed (block 66) for the use and guidance of the operator in pursuing the caller interface.

With the completion of the display, the computer and memory 26 may terminate the relay operation or alternatively the operator at the terminal CRT7 may be provided control of the termination. In either event, as illustrated in FIG. 2 by block 68, the final step of the relay involves bridging the terminal CRT5 through the units 26 and 16 to the caller and terminating the connection through the cable 30. This operation is accomplished by the bridge 18 under control of the computer and memory unit 26. Essentially, the attended terminal CRT5 is switched through the cable 30 from the communication facility C to the audio response unit 16. Consequently, the attended terminal CRT7 is interfaced with the caller at the remote terminal T1.

In the operation of the relay system as disclosed above, the use of a secondary communication path through the communication facility C accommodates a variety of different apparatus. That is, the secondary communication path accommodates all voice call switching equipment and networks which are traversed, supported and transparent to the process. Also, the operation is coordinated because the result is simply a telephone call where the caller's interaction is completely coordinated between the audio response unit and the destination terminal CRT1-CRTn.

In addition to being flexible and controlled, the system of the present invention affords an effective relay that is economical to implement and simple in operation. It will be apparent that the system of the present invention may be effectively used in telephonic interfaces to simply, easily and reliably accommodate relays to a human operator. Although the disclosed embodiment is directed to a specific format and embodiment, it will be apparent that the system may be variously embodied to accommodate any of a variety of individual structures and operating formats. Furthermore, it will be apparent that while the disclosed embodiment comprises specific elements and configurations, any of a variety of structures might be utilized. Accordingly, the scope hereof is deemed to be as set forth below in the claims.

What is claimed is:

1. A call processing system for use with a public telephone network communication facility, said facility including remote telephone terminals for callers, said apparatus comprising:
    an audio response unit for interfacing said remote telephone terminals through said network communication facility and receiving information, said audio response unit including means for dialing outbound to remote telephone terminals through said network communication facility;
    means for assigning a call reference number to remote telephone terminals interfacing with said audio response unit;
    control means for controlling said audio response unit and storing said received information identified by said call reference number;
    display telephone terminal means for interfacing said remote telephone terminals under predetermined conditions; and
    relay detector means operative with said control means for manifesting said predetermined conditions to actuate said means for dialing of said audio response unit to establish secondary communication between said control means and said display telephone terminal means through said telephone network communication facility to thereby accomplish a relay of a emote telephone terminal identified by a call reference number from said audio response unit along with identified received information to said display telephone terminal means.

2. A system according to claim 1 wherein under said predetermined condition, said audio response unit actuates said display telephone terminal means to indicate said call reference number.

3. A system according to claim 2 wherein said control means provides said identified received information to said display telephone terminal means on actuation of said display telephone terminal means with said call reference number.

4. A system according to claim 1 wherein said display telephone terminal means comprises a CRT terminal coupled to said telephone network communication facility.

5. A system according to claim 2 wherein said control mans relays a remote telephone terminal to said display telephone terminal means by bridging a connection from said audio response unit and terminating said secondary communication after said display telephone terminal means has indicated said call reference number.

6. A system according to claim 5 wherein said means for assigning a call reference number includes a counter.

* * * * *